United States Patent [19]
Danforth et al.

[11] Patent Number: 5,003,130
[45] Date of Patent: Mar. 26, 1991

[54] RUBBER GROMMET FOR VARIOUS SIZE WIRING HARNESSES

[75] Inventors: David J. Danforth, Livermore; Randy J. De Bortoli, Newark, both of Calif.

[73] Assignee: Paccar Inc., Bellevue, Wash.

[21] Appl. No.: 518,668

[22] Filed: May 3, 1990

[51] Int. Cl.$^5$ .......................... H01B 17/30; H02G 3/22
[52] U.S. Cl. ................................. 174/153 G; 277/178
[58] Field of Search ............ 174/65 G, 152 G, 153 G; 16/2; 248/56; 277/178

[56] References Cited

U.S. PATENT DOCUMENTS

| | | | |
|---|---|---|---|
| 4,640,479 | 2/1987 | Shely et al. | 248/56 |
| 4,797,513 | 1/1989 | Ono et al. | 174/153 G |

*Primary Examiner*—Laramie E. Askin
*Attorney, Agent, or Firm*—Flehr, Hohbach, Test, Albritton & Herbert

[57] ABSTRACT

A grommet comprising a generally planar portion having less than a complete 360 degree circumference, thereby exposing at least a first and a second surface with an angular gap therebetween. A conical section is connected to the generally planar portion, the conical section including a flap located approximately adjacent the angular gap. The flap overlaps a remainder of the conical section when the generally planar portion is radially compressed for installation into a firewall such that at least portions of the first and second surfaces are in contact with one another, thereby eliminating the angular gap. Thus, the flap is adjustable to accommodate various size wiring harnesses.

10 Claims, 2 Drawing Sheets

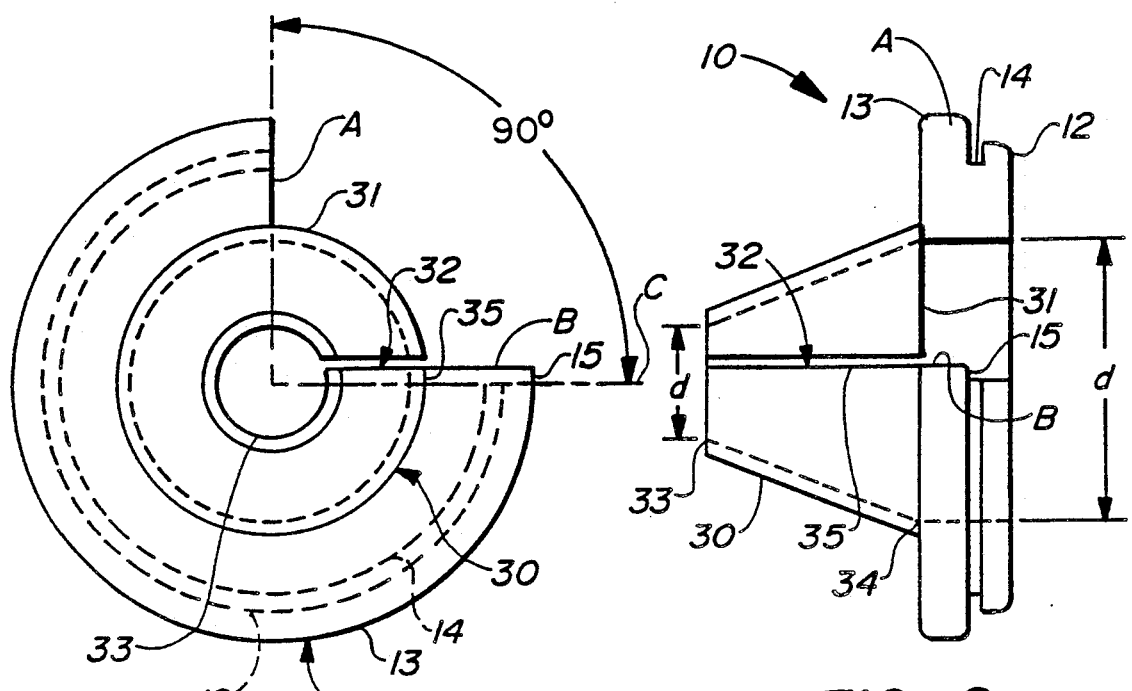
FIG._1  FIG._2
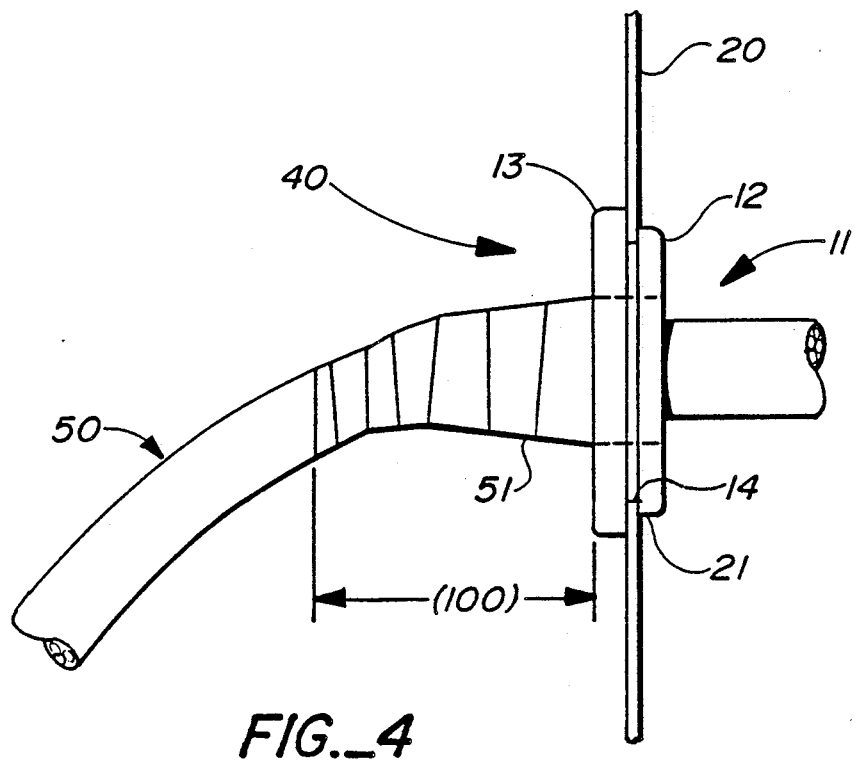
FIG._4

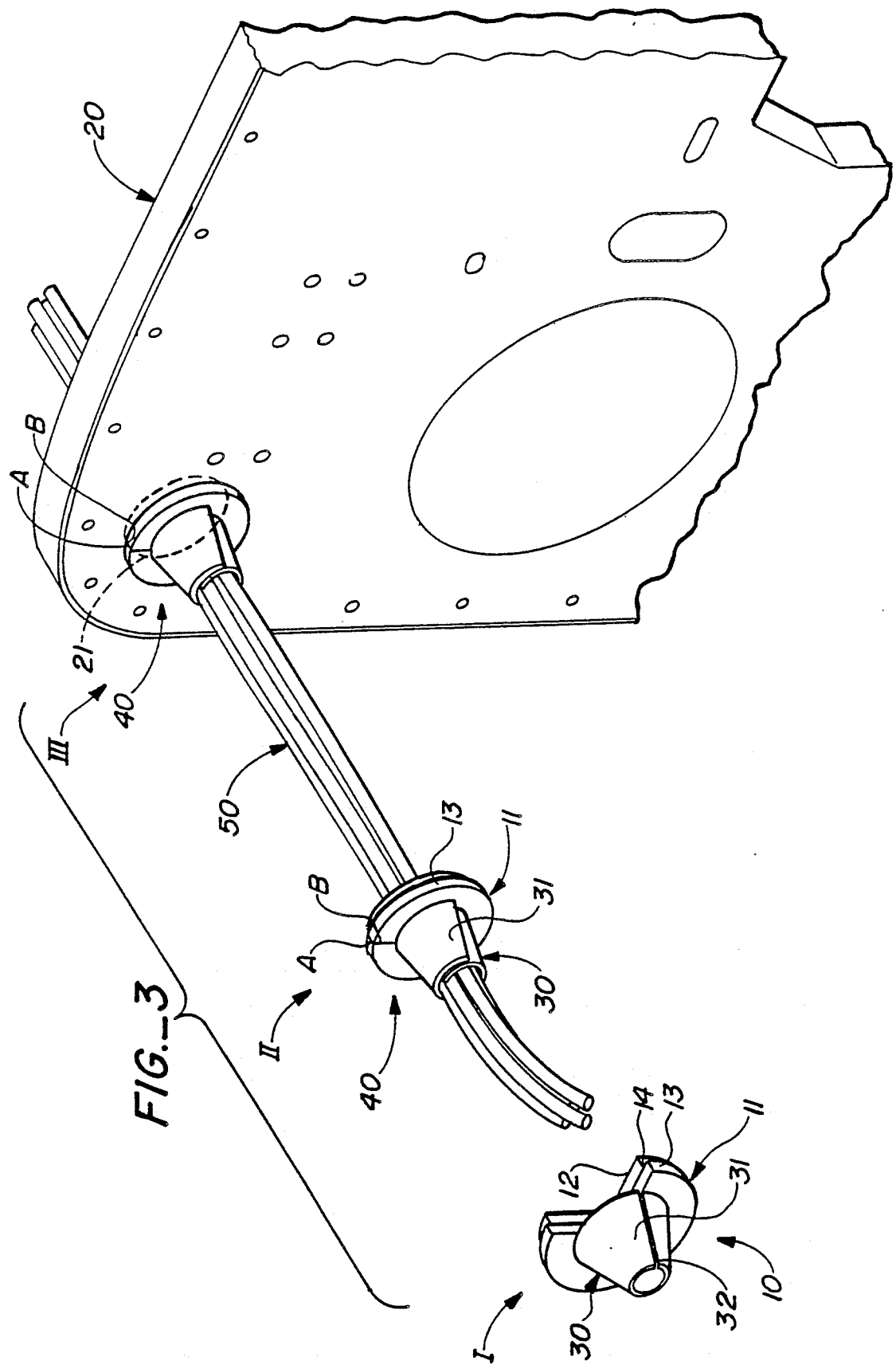

RUBBER GROMMET FOR VARIOUS SIZE WIRING HARNESSES

BACKGROUND OF THE INVENTION

The present invention relates to grommets for the installation of wiring harnesses through a truck firewall. More specifically, the present invention relates to a variable diameter grommet which is capable of accepting wire harnesses which range in diameter from ½ to 1¼ inch.

The use of grommets as a second conduit for passing wiring harnesses through a truck firewall is generally well known in the art. A grommet is basically a rubber device (although other materials can be used) through which a plurality of wires, referred to as a "wiring harness," are passed. A sealer such as putty is utilized in prior art embodiments to form a complete seal between the wiring harness and the grommet. The placement of a grommet in a firewall is generally illustrated in FIG. 3.

The function of a grommet is to pass the main electronic wires from the engine to the interior of a truck cab. As modern technology advances, more and more aspects of a truck engine are becoming electronic and, therefore, require signal lines passing through a truck firewall to the truck cab where operating conditions are displayed on the dash panel. Another factor affecting the volume of wires passing between the engine and cab of a truck is the fact that a substantial number of truck cabs are custom built and, therefore, although the chassis are constructed on the same assembly line, a different wiring configuration will be needed for different trucks. This presents a problem with the use of prior art grommets which have only a fixed opening and, therefore, necessitate the use of extraneous materials to produce a tight fit between a wiring harness and a grommet.

In addition to having a fixed opening, prior art grommets suffer from several other shortcomings. These grommets resemble a donut in that they are configured of a solid piece of material with a hole therethrough. This requires all electrical wires between the engine and the cab to be grouped in one location and fed through the grommet into the truck cab after which the grommet is inserted in the firewall. The grouping of all electrical wires to a singular location before entering into the grommet is a cumbersome task on an assembly line. Ease and economy would be furthered by connecting a wire through the firewall during initial installation of a part from which a wire extends.

Since the prior art grommets have a fixed opening therethrough, putty is used to plug the extra space created between a wiring harness and a grommet. The putty also suffers from several shortcomings. For example, putty deteriorates and falls out completely with time. Additionally, the putty is unsightly and difficult to work with, necessitating a considerably longer time to install. Moreover, there is no objective control of putty installation on an assembly line. It is not only easily forgotten, but creates a quality control problem in that one assembly line worker may put on a little putty and the next a lot of putty.

SUMMARY OF THE INVENTION

Accordingly, it is an object of the present invention to provide a grommet having a variable diameter for accepting various size wiring harnesses.

It is another object of the present invention to provide a grommet which does not have a closed circumference and thereby may be installed at any point on an assembly line.

It is another object of the present invention to provide a grommet which is easily sealed about a wiring harness with the use of electrical tape that is compatible with the rubber in the grommet.

It is yet another object of the present invention to provide a grommet which is resistant to oil, heat, water and ozone.

The attainment of these and related objects may be achieved through use of the novel variable diameter grommet herein disclosed. A variable diameter grommet in accordance with this invention has a generally planar portion having less than a complete 360 degree circumference, thereby exposing at least a first and a second surface with an angular gap therebetween. A conical section is connected to the generally planar portion, the conical section including a flap located approximately adjacent to the angular gap. The flap overlaps a remainder of the conical section when the generally planar portion is radially compressed for installation into a firewall such that at least portions of the first and second surfaces are in contact with one another, thereby eliminating the angular gap. Thus, the flap is adjustable to accommodate various size wiring harnesses.

The attainment of the foregoing and related objects, advantages and features of the invention should be more readily apparent to those skilled in the art, after review of the following more detailed description of the invention, taken together with the drawings.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 is a front view of the grommet of the preferred embodiment.

FIG. 2 is a side view of the grommet of FIG. 1.

FIG. 3 is a perspective view of the grommet of the preferred embodiment at three separate stages in the process of securing a wiring harness in a firewall.

FIG. 4 is a side view of a completed assembly of the grommet of the preferred embodiment.

DETAILED DESCRIPTION OF THE PREFERRED EMBODIMENT

Referring to FIG. 1, a front view of the grommet 10 of the preferred embodiment is shown. The grommet 10 is made of a pliable, oil resistant rubber. The grommet 10 is comprised of a flat portion 11 and a conical section 30. A first step in configuring the grommet 10 of the preferred embodiment is to injection mold a grommet device having a solid continuous 360 degree flat portion and a conical section 30. (Note that alternative fabrication processes are available.) A next step is to remove a section of the flat portion which represents approximately 90 degrees of the flat portion to form an approximately 270 degrees flat portion 11. By removing part of the flat portion while retaining the whole of the conical section 30, (although having a slit therein) a flap 31 is created which is not directly secured to the flat portion 11. Referring to FIGS. 1 and 2, the flat portion 11 comprises a plurality of features, including an outer wall 13, an inner wall 12, and a groove 14 configured therebetween. When the grommet 10 is inserted into an opening in a truck firewall (see FIG. 3) the flat portion 11 is pushed together so that side A and side B come into contact with one another. In this configuration, the grommet may be shoved into a hole 21 in the firewall 20 (see FIG. 3). The groove 14 is designed to receive the firewall 21 with the inner wall 12 being on the cab side of the firewall 20 and the outer wall 13 being on the engine side of the firewall 20.

Referring to the conical section 30, this section protrudes outwardly from the flat portion 11. When the grommet 10 is installed in the firewall, the conical section 30 extends toward the engine side of the firewall. When the flat portion 11 is compressed radially (side A is brought into contact with side B), the flap 31 of the conical section produces an extraneous shield which wraps around a remaining portion of the conical section 30. When the grommet 10 is not radially compressed a small slit 32 is present between the flap 31 and the remainder of the conical section 30. This slit 32 represents the thickness of a cutting means used to create the slit 32. The conical section has two openings therein. There is a small opening 33 located away from the flat portion 11 with a diameter of approximately 19.9 mm. A larger opening 34 is created where the conical section 30 joins the flat portion 11. This large opening 34 has a diameter of approximately 55 mm.

An important dimensional aspect to recognize is that a small portion 35 of the conical section 30 extends up above the 90 degree line indicated in FIG. 1 by letter C. Similarly, there is a small portion 15 of the flat portion 11 which extends above the 90 degree line C. The purpose of creating a larger outer wall 13 than inner wall 12 is so that when the grommet is compressed and side A is flush with side B, the outer wall 13 necessarily forms a complete seal, thereby keeping liquid, moisture, dirt and other contaminants inside the engine compartment and out of the cab. Note also that the inner wall 12 has a smaller radius than outer wall 13, so that it is easier to install in the firewall 20.

Referring to FIG. 3, the grommet 10 in the preferred embodiment is shown in three stages of installation. The first stage I represents the grommet 10 before installation, or as indicated in FIGS. 1 and 2. The second stage II illustrates the grommet (now designated by reference numeral 40 to refer to the "closed" grommet) wrapped around a wiring harness 50. The grommet 40 has been compressed so that surfaces A and B are in contact with one another and flap 31 overlaps a remaining portion of the conical section 30.

The third stage III illustrates the grommet 40 of the preferred embodiment installed into opening 21 in the firewall 20. Stage III also illustrates the placement of a wire harness through the grommet 40. It is important to note that the structure of the flap 31 causes it to wrap around a remaining portion of the conical section 30, thereby providing an additional wrap for securely holding a wiring harness 50 regardless of the size of the wiring harness (up to the diameter of the grommet). Thus, the outer wall 13 forms an environmentally tight seal while the conical section is adjustable to accommodate various sized wiring harnesses. Furthermore, it is possible to remove and install new grommets 40 without affecting the connections of wires between the engine and the truck cab. To the contrary, in prior art devices it was necessary to disconnect all wires passing through a grommet in order to install a new grommet. Therefore, not only does the grommet 40 provide a tight seal and an accommodating diameter, but it provides simple installation and replacement.

Referring to FIG. 4, a completely installed grommet 40 of the preferred embodiment is illustrated. FIG. 4 represents a side view and shows clearly the flat portion 11 mounted into hole 21 in the firewall 20. The inner wall 12 is on the cab side of the firewall 20 and the outer wall 13 is on the engine side of the firewall 20. The conical section 30 is obscured from view because it is wrapped in electrical tape 51 which is used to complete the seal between the grommet 40 and the wiring harness 50. Several types of electrical tape are sufficient to produce an adequate seal between the grommet 40 and the wiring harness 50. However, 3M Corporation of Minneapolis, Minn., produces a high quality, heat resistant, electrical tape which is particularly suitable for the purposes of the present invention. The rubber utilized to create the grommet 40 is oil resistant, heat resistant, water resistant and ozone resistant. Also, the rubber of the grommet 10 and 40 is 50 durometer EPDM.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A grommet having a variable diameter for accommodating and protecting various size wiring harnesses passing through a firewall, comprising:

a generally planar portion having a configuration of less than a complete 360 degree circumference, said configuration exposing at least a first and a second surface having a gap therebetween;

a conical section connected to said generally planar portion, said conical section having a slit therein and including a flap located approximately adjacent said gap;

said flap extending past a remainder of said conical section when said generally planar portion is compressed such that at least portions of said first and second surfaces are in contact with one another, thereby eliminating said gap;

wherein an amount to which said flap extends past said remainder of said conical section is adjustable to accommodate various size wiring harnesses.

2. The grommet of claim 1 wherein at least portions of said first and second surfaces are in contact with one another when said planar portion is mounted in a firewall, thereby forming a complete 360 degree circumference.

3. The grommet of claim 1 wherein said generally planar portion comprises an inner wall and an outer wall and is further configured so that a groove is created between said inner wall and outer wall, said groove being for receiving said firewall.

4. The grommet of claim 3 wherein said outer wall has a greater diameter than said inner wall.

5. The grommet of claim 1 wherein said flap is secured to said remainder of said conical section by electrical tape.

6. The grommet of claim 1 wherein said planar portion and conical section including said flap are made of rubber.

7. The grommet of claim 1 wherein said conical section has a tip and a base, said tip having a diameter of approximately ½ inch, said base having a diameter of approximately 1 and ¼ inch.

8. A grommet, comprising:

a generally planar portion having less than a complete 360 degree circumference, thereby exposing at least a first and a second surface with an angular gap therebetween;

a conical section connected to said generally planar portion, said conical section including a flap located approximately adjacent said angular gap;

said flap extending past a remainder of said conical section when said generally planar portion is radially compressed for installation into a firewall such that at least portions of said first and second surfaces are in contact with one another, thereby eliminating said angular gap;

wherein said flap is adjustable to accommodate various size wiring harnesses.

9. The grommet of claim 8 wherein said angular gap is approximately 90 degrees.

10. A method for forming a grommet having a variable diameter for accommodating and protecting various size wiring harnesses passing through a firewall, comprising the steps of:

configuring a generally planar member to have a hole therein and less than a complete 360 degree circumference, thereby exposing at least a first and a second surface with a gap therebetween;

connecting a conical section to said generally planar member, said conical section being about said hole;

forming a flap approximately adjacent gap;

radially compressing said generally member so that said first and second surfaces another, thereby forming a complete 360 degree circumference;

said radial compression causing flap to overlap a remainder of said conical section, the amount of overlap being adjustable to accommodate various size wiring harnesses.

* * * * *

UNITED STATES PATENT AND TRADEMARK OFFICE
CERTIFICATE OF CORRECTION

PATENT NO. : 5,003,130

DATED : March 26, 1991

INVENTOR(S) : David J. Danforth and Randy J. De Bortoli

It is certified that error appears in the above-identified patent and that said Letters Patent is hereby corrected as shown below:

Col. 6, line 18, after "generally" insert ---planar---.

Col. 6, line 19, after "surfaces" insert ---contact one---.

Signed and Sealed this

Twenty-eighth Day of July, 1992

Attest:

DOUGLAS B. COMER

*Attesting Officer*      *Acting Commissioner of Patents and Trademarks*